United States Patent

Carminati

[11] Patent Number: 4,511,058
[45] Date of Patent: Apr. 16, 1985

[54] SPOKE DISPENSER FOR SPOKED WHEELS IN A SPOKE-FITTING MACHINE

[75] Inventor: Julien Carminati, Annecy-le-Vieux, France

[73] Assignee: Centre de Production Mecanique, Epagny, France

[21] Appl. No.: 402,745

[22] Filed: Jul. 28, 1982

[30] Foreign Application Priority Data

Aug. 3, 1981 [FR] France ................ 81 15318

[51] Int. Cl.³ ............................................ B23Q 7/18
[52] U.S. Cl. .......................................... 221/2; 221/13;
221/172; 221/212; 221/224; 221/233; 221/254;
221/266; 193/38
[58] Field of Search ............. 221/192, 193, 194, 195,
221/196, 212, 224, 233, 236, 251, 254, 266, 277,
156, 171, 172, 312 R, 2, 13; 193/38

[56] References Cited

U.S. PATENT DOCUMENTS

| Re. 14,290 | 4/1917 | Gamper | 221/212 X |
|---|---|---|---|
| 2,310,884 | 2/1943 | Trevaskis | 193/38 X |
| 2,420,812 | 5/1947 | Brunner | 221/233 X |
| 2,677,452 | 5/1954 | Mallow | 198/404 |
| 2,696,327 | 12/1954 | Woodruff | 221/233 X |
| 2,743,001 | 4/1956 | Nordquist | 221/212 X |
| 2,819,465 | 1/1958 | McIlvin | 221/156 |
| 2,823,830 | 2/1958 | Kreidler | 221/171 |
| 2,959,270 | 11/1960 | Heaton | 198/424 |
| 3,080,092 | 3/1963 | Zdanis | 221/254 X |
| 3,115,235 | 12/1963 | Othon | 221/171 X |
| 3,737,072 | 6/1973 | Deitrick | 221/277 X |
| 3,758,931 | 9/1973 | Patterson | 29/159.02 |
| 4,062,095 | 12/1978 | Storz | 29/802 |

FOREIGN PATENT DOCUMENTS

| 2027788 | 6/1969 | Fed. Rep. of Germany |  |
| 1017917 | 12/1952 | France | 221/212 |
| 245322 | 1/1926 | United Kingdom | 221/192 |

Primary Examiner—Joseph J. Rolla
Assistant Examiner—Lawrence J. Miller
Attorney, Agent, or Firm—Roland Plottel

[57] ABSTRACT

A dispenser is provided having a reservoir, a knife driven with a vertical reciprocal translational movement, and an inclinded ramp feeding the spokes into abutment against a drum provided with peripheral grooves. The rotation of the drum feeds the spokes one by one into a guide device comprising two inclined surfaces, the supper surface having a smooth surface and the lower surface being made of an adherent material. A spoke slides between the two surfaces and is discharged to a spoke holder of a spoke fitting machine.

8 Claims, 5 Drawing Figures

SPOKE DISPENSER FOR SPOKED WHEELS IN A SPOKE-FITTING MACHINE

BACKGROUND OF THE INVENTION

The present invention relates to a device for automatically feeding spokes one by one from a reservoir to a machine for fitting the spokes into the holes of a spoked-wheel hub.

Fitting spokes into spoked-wheel hubs is a meticulous and delicate operation which up to now has been carried out manually. Machines are being developed for carrying out this fitting operation automatically. It is then necessary to feed these devices with spokes, these spokes being disposed in a given position. In fact, the spokes comprise generally a cylindrical rectilinear rod portion, one end of which is curved forming a head of larger diameter than the rod portion. For correct fitting, some devices require the head to be positioned in a definite direction, so that the spoke can pass into the spoke-fitting machine and so that the spoke is correctly positioned on the spoked-wheel hub.

Dispensers have already been constructed for different parts. Thus, U.S. Pat. No. 3,080,092 describes a screw dispenser comprising a knife selector followed by a slide ramp with a special section, the screws passing under a roller having circular peripheral grooves in which the screws are engaged when they are in a correct position. In this device the roller serves solely as abutment and cannot be suitable for selecting spokes.

U.S. Pat. No. 2,823,830 describes means for feeding screws in the correct position by means of a rotary conveyor disposed between two ducts. This device does not however provide true selection and is inapplicable to the shape of spokes.

SUMMARY OF THE INVENTION

An aim of the present invention is to provide a spoke dispenser for automatically presenting the spokes one by one and feeding them in a predetermined position into the spoke-fitting machine. In a first embodiment described, the spoke-fitting machine comprises a substantially horizontal channel in which is inserted the spoke rod, the spoke head being disposed above the channel. Thus, the device brings the spokes into a substantially horizontal position, by a translational movement from top to bottom, the head of the spoke being turned upwards.

In a second embodiment, the channel is wider and it is sufficient for the spoke to be in the right direction, whatever the inclination of the head.

Another aim of the present invention is to provide a dispenser for avoiding that two spokes be presented at one and the same time, although the shape of the spokes with a curved head tends to cause them to hook on to one another and to be dragged along simultaneously.

Another aim of the invention is to propose a dispenser capable of avoiding jamming of the spokes and seizing up of the device.

According to another aim of the invention, the spokes are presented in a very short time so as to limit the idle periods and increase the rate of the spoke-fitting machine.

In order to accomplish the foregoing, and according to one feature of the invention, the dispenser comprises a spoke reservoir in which the spokes are disposed in a horizontal position, a knife device for selecting the spokes and feeding them one by one from the reservoir to a downward guide ramp, and a drum mounted for rotation about a transverse axis. The drum is is provided with peripheral grooves parallel to its axis having a section greater than the section of the spoke rods. The drum is disposed downstream of the guide ramp to receive the spokes in its grooves and is associated with fixed stops such as a scraper. Rotation of the drum ensures simultaneously selection of the spokes, intermediate stockage thereof in a separate queue and transport thereof from the guide ramp to a discharge ramp.

According to another feature of the invention, the guide device comprises two substantially parallel sloping surfaces, disposed facing each other at a predetermined distance so that a spoke may slide there between. The first surface or upper surface has a surface an the second surface or lower surface is made of a material to which the spoke will adhere so as to create a rotational torque on the spoke during sliding thereof. The first surface thus prevents rotation of the head so as to hold it above the rod.

According to another feature of the invention, the first surface has a width at least equal to the length of the spoke, so that the spoke head bears slidingly thereagainst. The second surface has a smaller width so as to free the spoke head. The distance between the two surfaces is greater than the diameter of the spoke rod and less than half the sum of the diameter of the rod and the diameter of the spoke head. Thus, a guide device is provided ensuring maximum freedom for the spoke, while preventing rotation thereof and while holding the spoke head above the rod. Chances of jamming and sticking of the spokes are thus considerably reduced.

According to another arrangement, the knife selection device comprises two consecutive knives, a first knife with a large range of movement, followed by a second knife with a smaller range of movement but in a higher position.

According to another feature of the invention, a detector is provided to detect the presence of a spoke in the upper zone of the cylinder and to cause the cylinder and the knife to stop until an order is received that a spoke has been fed into the spoke-fitting machine. Thus, the device freely selects the spokes from the reservoir until a spoke is presented ready to be fed, the device then being maintained in a waiting condition. Thus the transit times of the spokes are reduced without leading to possible delays due to the fact that the tangling of the spokes in the reservoir does not allow the knife to separate a spoke at each movement.

BRIEF DESCRIPTION OF THE DRAWINGS

Other characteristics and advantages of the present invention will be clear from the following description of particular embodiments, made with reference to the accompanying figures in which.

DESCRIPTION OF THE PREFERRED EMBODIMENTS

Figure 1:
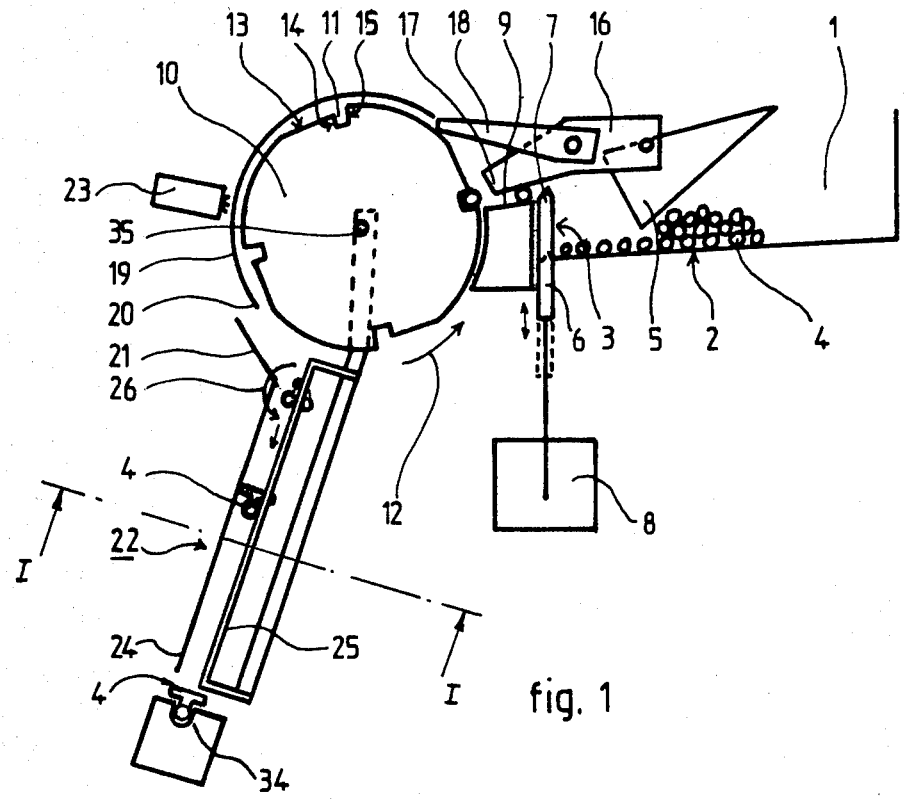
FIG. 1 shows a schematical view in longitudinal section of the dispenser of the present invention according to a first embodiment.
Figure 2:
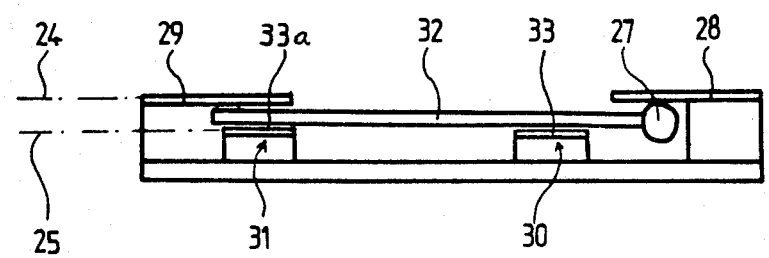
FIG. 2 shows a partial sectional view along axis I—I of FIG. 1.
Figure 5:
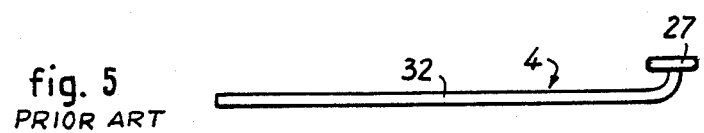
FIG. 5 is a side elevational view illustrating a known type of spoke to which the present invention is directed.

As shown in FIGS. 1 and 2, the dispenser has a reservoir 1 whose bottom 2 slopes towards its outlet end 3. Spokes 4 are disposed horizontally in reservoir 1 and are shown in cross section in FIG. 1. Both their ends are guided by the lateral sides of reservoir 1, these lateral sides being possibly spaced apart by an adjustable distance so as to be able to adapt it to spokes of different lengths. In the neighborhood of the outlet end 3, a fixed stop 5 causes reduction of the thickness of the layer of spokes, so as to reduce the number of spokes appearing simultaneously in the neighborhood of end 3.

Reservoir 1 is limited at its outlet end 3 by a knife 6, having an upper horizontal end 7 of tapered section, and driven with a vertical reciprocating translational movement by drive means 8. Knife 6 is movable between a first position, shown with a broken line in FIG. 1, in which its upper end 7 is flush with the bottom 2 of reservoir 1, and a second position, shown with a continuous line, in which the upper end 7 is raised and is flush with an inclined ramp 9 on which the spoke slides and abuts against a rotary drum 10 with substantially horizontal axis.

Drum 10 is provided with longitudinal peripheral grooves 11 having a section greater than the section of the rods of the spokes. Drum 10, rotated in the direction shown by arrow 12, carries away the spokes inserted in grooves 11. So that the spokes are properly inserted into the grooves, each groove is preceded by a land 13, so that the foremost lip 14 of the groove is slightly lower than the lip 15 of the same groove. Thus, a catching structure is provided allowing the spoke rod to be brought progressively nearer the axis of rotation of drum 10 and insertion thereof into groove 11. As shown in FIG. 1, ramp 9 is flush with drum 10 slightly above the horizontal diameter passing through the rotational axis of drum 10.

The present invention also provides means for preventing several spokes from being inserted and hooked on to the drum in the case where several spokes are fed by knife 6. Thus, a first fixed stop 16, disposed above ramp 9 and knife 6, at a distance slightly greater than the diameter of the spoke rod, defines a feed channel avoiding tangling of the spokes. The snout 17 of this stop 16 bears down on the spokes and possibly causes rotation thereof against the cylinder and only lets through the spokes inserted into a groove 11. A second fixed stop 18, or scraper, disposed above the first one, has one end positioned to bear on the surface of drum 10, so as to ensure that the spoke carried by the drum is well inserted over the whole of its length in the groove 11 and to cause a second spoke to drop which may possibly have been dragged along with the first spoke inserted in the groove.

A cylindrical cover 19 covers the upper part of drum 10, between the second stop 18 and the opposite fall of the drum, so as to hold the spokes in position in the grooves during the whole of their travel. After end 20 of the cover, the spokes fall on to slides 21 feeding them to a guide device 22.

To limit the transit times and increase the speed of the device, a detector 23 is placed in the vicinity of end 20 of cover 19, this detector causing drum 10 and knife 6 to stop when a spoke is present in a groove 11 opposite detector 23. The movement of drum 10 and knife 6 is again initiated as soon as a spoke expulsion order has been given to the device by the control members of the spoke-fitting machine.

The guide device 22 comprises two sloping and substantially parallel surfaces, disposed facing one another so as to allow a spoke to slide therebetween. A first surface 24, or upper surface, has a downward facing surface which is smooth to allow a spoke to easily slide against it. A second surface 25, or lower surface, has an upward facing surface made of an adherent material, so that the second surface creates on the spoke a rotational torque during its fall, as shown by arrow 26. The upper surface 24 has a width greater than the length of the spoke, so that the spoke head 27 bears against this surface, whereas the lower surface 25 has a width less than the length of the spoke so as to allow free rotation of head 27.

As shown in section in FIG. 2, surfaces 24 and 25 need not be continuous and may be formed for example from separate inclined metal strips. The upper surface 24, in the embodiment shown, is formed by two metal strips 28 and 29, disposed at opposite ends of the spoke. The lower surface 25 is formed by two strips 30 and 31, a first strip 30 might for example be positioned at a quarter of the length of the spoke rod 32 from head 27 and the second strip 31 being disposed opposite strip 29 in the vicinity of the other end of the spoke. Strips 30 and 31 are covered with layers 33 and 33a of an adherent material such as rubber. The distance between the planes formed by the upper 24 and lower 25 surface is predetermined so as to allow rod 32 to rotate on strips 30 and 31, while it slides over the smooth surface of upper strip 29 and while head 27 will be urged against and slide on the smooth surface of strip 28. The distance chosen between surfaces 24 and 25 will preferably be between the thickness of rod 32 and half the sum of the diameters of rod 32 and head 27.

After sliding between the surfaces 24 and 25, the spoke falls into a channel 34 forming part of the spoke-fitting machine. To provide correct psoitioning of the spoke in the channel, it is preferable to position the guide device 22 so that its lower end is flush with channel 34. In this case, it may be necessary to provide means for causing the guide device 22 to escape after insertion of a spoke into channel 34, which may be achieved by causing this guide device 22 to move upwardly on a rotary support, rotating for example about axis 35 of drum 10, and driven by drive means not shown in the figures.

The embodiment which has just been described provides correct selection of the spokes and positioning thereof with head upwards at the outlet of the discharge ramp 22. The particular shape of the spokes makes their selection delicate and the device is well adapted to this shape. However, some selection errors have been noted during numerous tests carried out by the Applicant.

To reduce the number of selection errors and improve the reliability of the device, the following embodiment may be preferred in which the selection means associated with the rotary drum have been modified. Furthermore, this second embodiment will be described in connection with a modified and simplified discharge ramp 22, which no longer provides systematic positioning upwards of the spoke head at the outlet of the ramp. This simplified embodiment of the discharge ramp is suitable for an application in which it is not necessary to fix the position of this spoke head. This simplified embodiment of the discharge ramp may of course be associated with the first embodiment of the previously described selection means.

Figure 3:
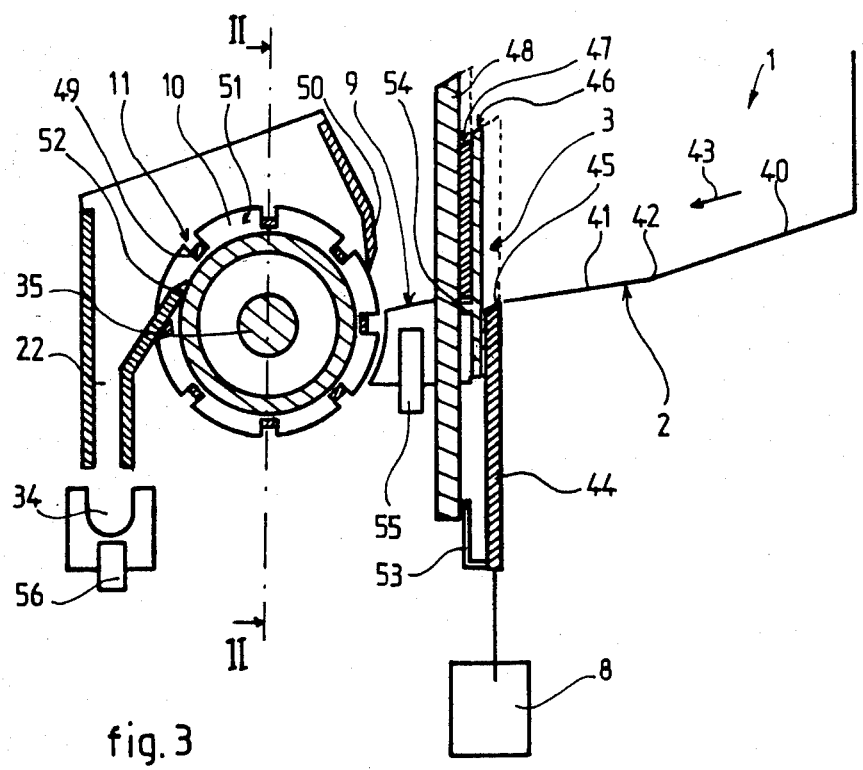
FIG. 3 shows a longitudinal sectional view of a dispenser according to a second embodiment.
Figure 4:
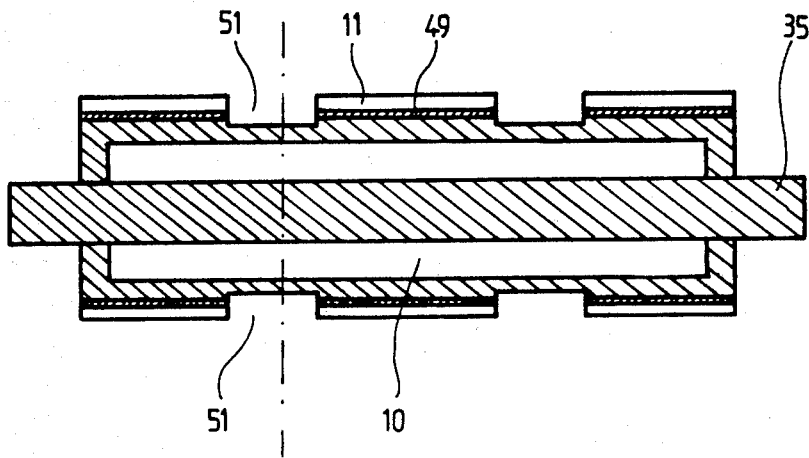
FIG. 4 shows a cross sectional view along the axis II—II of FIG. 3.

This second embodiment is illustrated in FIGS. 3 and 4. The bottom 2 of reservoir 1 has two successive plane parts 40 and 41 forming a re-entrant dihedron, as shown in FIG. 3, connected along a transverse line 42 with respect to the feed travel direction 43 of the spokes. This arrangement promotes the parallelism of the spokes and transverse positioning thereof in the reservoir. It may also be used in the embodiment of FIGS. 1 and 2. A continuously curved bottom 2 may be used defined by horizontal transverse generatrices, such as a cylinder portion.

The selection device at outlet 3 of the reservoir has a first knife 44, driven with a vertical reciprocating translational movement, under the action of drive means 8. Knife 44 is movable between a first position, shown with a continuous line in the figure, in which the upper edge 45 is flush with the bottom 2 of reservoir 1, and a second position, shown with a broken line, in which the upper edge 45 reaches the level of an intermediate ramp 46 leading to a second knife 47. The second knife is driven with a vertical reciprocating translational movement in synchronism with the first knife. It is moveable between a lower position, shown with a continuous line in the figure, in which its upper edge is flush with intermediate ramp 46, and an upper position in which its upper edge reaches the level of an upper ramp 48. The upper ramp 48 is joined to guide ramp 9 by a jump. Ramps 9 and 48 may however be provided on the same level. Tests have shown that the first knife 44 must have a large vertical range of movement, for example of the order of half the length of the rod of a spoke, whereas the second knife may have a smaller range of movement. The thickness of the first knife is chosen so as to allow insertion of one to three spokes on its upper edge. This thickness is substantially the same as the sum of the thicknesses of the second knife and of the intermediate ramp 46. The second knife has a reduced thickness, so as to take up only a single spoke at a time. The rotary drum 10, rotated about the transverse axis 35 by a drive motor not shown in the figure, comprises a substantially cylindrical outer surface in which are cut longitudinal peripheral grooves 11, parallel to axis 35, having a section sufficient to accomodate the rod of a spoke. Magnets 49 are disposed in the bottom of grooves 11, which promote the feeding of a single spoke at a time and, and push the rod into the groove bottom during the whole of its travel on the drum. A scraper 50 is disposed at the beginning of the upper part of the drum, as shown in the figure, in the vicinity of the outer surface.

To free the spokes and eject them on to the discharge ramp 22, circular peripheral furrows 51 are provided on the drum, deeper than grooves 11 and in which are accomodated the upper comb-shaped ends 52 of the discharge ramp 22.

In this embodiment, the discharge ramp 22 is simplified, and leads the spokes over a short path into a wide channel 34. The slope of the spoke head with respect to the rod is immaterial in this device.

The second knife 47 may be driven by the first knife 44. For this purpose, the first knife is integral with a rod 53 bearing against the lower edge of the second knife and raising it during the end of downward travel of the first knife. A stop 54 limits the downward travel of the second knife. Tests have shown that it is advisable to limit as much as possible the height of ramp 22 so as to avoid bouncing of the spokes and reduce their fall time. According to a particular embodiment, which increases the certainty of the presence of a spoke for rapid ejection thereof on to ramp 22, a first detector 55 is disposed at the level of guide ramp 9 so as to cause the knives to stop when one spoke at least is present on this ramp. A second detector 56 is disposed downstream of the discharge ramp 22, for example at the level of channel 34, and causes the drum to stop when a spoke is present in the channel.

In the case of an application in connection with a spoke fitting machine having a pushing carriage for ejecting the spoke from channel 34, it may be necessary to provide a third detector for detecting that the carriage is in the correct position and allowing a new spoke to be introduced into the channel. This third detector controls the setting in rotation again of the drum.

The present invention is not limited to the embodiments which have been explicitly described, but it includes the different variations and generalizations contained within the scope of the following claims.

What is claimed is:

1. A dispenser of spokes for spoked wheels, each spoke formed by a cylindrical rectilinear rod having a head at one end thereof of a diameter larger than that of the rod, comprising a spoke reservoir, a knife selection device positioned at the outlet end of the reservoir for selecting spokes and disposing them on a downward guide ramp, a rotary drum mounted adjacent the outlet end of said guide ramp for rotational movement about a transverse axis with respect to the feed travel direction of the spokes, peripheral grooves arranged on the surface of said drum and extending parallel to the axis of rotation of said drum, the cross-section of said grooves being greater than the cross-section of the spoke rods, the drum being disposed down-stream of said guide ramp for introduction of the spokes into said grooves, and a discharge ramp disposed on the side of said drum opposite said guide ramp to collect and guide the spokes after their travel on the drum, so that rotation of the drum transports the spokes from said downward guide ramp to said discharge ramp, said discharge ramp comprising two inclined and substantially parallel guide surfaces facing one another at a predetermined distance apart so as to allow a spoke to slide there between, the first guide surface being smooth and having a width at least equal to the length of the spoke, the second guide surface being made from an adherent material and having a smaller width than said first guide surface so as to allow free rotation of the spoke head, the distance between the two surfaces being greater than the diameter of the spoke rod and less than half the sum of the diameter of the rod and the distance of the end of the spoke head to the axis of the rod, so that the second surface creates a rotation torque on said spoke during sliding thereof whereby the spoke head slidingly engages the first guide surface and remains in a position upwards with respect to said rod.

2. The dispenser as claimed in one of claims 1 wherein said first guide surface is made from smooth material and the second guide surface is formed by inclined metal strips covered with a layer of material such as rubber.

3. The dispenser as claimed in claim 1, further comprising fixed stop means for preventing two or more spokes from being simultaneously inserted into one of said grooves, said stop means comprising a fixed scraper disposed in the vicinity of the upper surface of said drum.

4. The dispenser as claimed in claim 1 further comprising magnets disposed in the bottom of said grooves and a comb forming the upper end of said discharge ramp, said comb being provided with teeth, the teeth of said comb engaging in peripheral circular furrows formed in said drum.

5. The dispenser as claimed in claim 1, wherein said knife selection device comprises two consecutive knives separated by an intermediate ramp and driven with vertical reciprocating translational movements, a first knife with a first range of movement whose upper edge moves between a lower position at the level of the bottom of said reservoir and an upper position at the level of said intermediate ramp, a second knife with a second range of movement smaller than said first range whose upper edge moves between a lower position at the level of the intermediate ramp and an upper position at the level of an upper ramp, said upper ramp being at a level higher than said intermediate ramp and adjacent said downward guide ramp.

6. The dispenser as claimed in claim 1, wherein the bottom of said reservoir is formed by two planar parts forming a re-entrant dihedron, said parts connected together along a transverse line with respect to the feed travel direction of said spokes.

7. The dispenser as claimed in claim 1, wherein said drum has upper and lower zones, and further comprising a detector located in the proximity of said discharge ramp for detecting the presence of a spoke in the upper zone of the drum and for causing the drum and knife selection device to stop until an order is received that a spoke has been discharged into the discharge ramp, so that the device for selecting the spokes operates until a spoke appears in front of the detector.

8. The dispenser as claimed in claim 1, wherein there is provided a first detector disposed at the level of said guide ramp for controlling stopping of the knife device when a spoke is present on the guide ramp and a second detector disposed downstream of said discharge ramp for controlling stopping of the drum when a spoke is present at the output of the discharge ramp.

* * * * *